(12) United States Patent
Höme et al.

(10) Patent No.: US 10,735,257 B2
(45) Date of Patent: Aug. 4, 2020

(54) COMMISSIONING MACHINES WITH VIRTUAL COMPONENTS IN ISOLATED OPERATION WITHOUT IP ADDRESS ASSIGNMENT

(71) Applicant: SIEMENS AKTIENGESELLSCHAFT, Munich (DE)

(72) Inventors: Stephan Höme, Schwabach (DE); Steffen Peschmann, Velburg (DE); Thomas Talanis, Heroldsbach (DE); Martin Rziha, Zirndorf (DE); Harald Albrecht, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 144 days.

(21) Appl. No.: 15/902,776

(22) Filed: Feb. 22, 2018

(65) Prior Publication Data
US 2018/0248752 A1    Aug. 30, 2018

(30) Foreign Application Priority Data
Feb. 23, 2017 (EP) .................................. 17157661

(51) Int. Cl.
    *G06F 15/173*      (2006.01)
    *H04L 12/24*      (2006.01)
    (Continued)

(52) U.S. Cl.
    CPC ...... *H04L 41/0809* (2013.01); *G05B 19/4185* (2013.01); *H04L 45/586* (2013.01);
    (Continued)

(58) Field of Classification Search
    CPC ...... G05B 19/4185; G05B 2219/31198; G05B 2219/31448; G05B 2219/32398;
    (Continued)

(56) References Cited

U.S. PATENT DOCUMENTS

| 6,944,785 B2 * | 9/2005 | Gadir | G06F 11/2005 |
| | | | 714/4.11 |
| 7,991,859 B1 * | 8/2011 | Miller | H04L 41/0803 |
| | | | 709/220 |

(Continued)

FOREIGN PATENT DOCUMENTS

| EP | 2506503 A1 | 10/2012 |
| EP | 2448182 B1 | 12/2013 |

(Continued)

*Primary Examiner* — Chris Parry
*Assistant Examiner* — Dixon F Dabipi
(74) *Attorney, Agent, or Firm* — Henry M. Feiereisen LLC (57) ABSTRACT

A computer network has ports connected to production machines (PM) and communicating with an assigned virtual user interface and a higher-ranking facility located outside the PM. Connection of an additional PM is monitored, in which case a commissioning service automatically assigns a virtual user interface to the additional PM, re-initializes an individual virtual computer network within the computer network and connects the additional PM to the virtual user interface via the re-initialized virtual computer network. Communication between the additional PM and the assigned virtual user interface is isolated from other communications until, a release command is specified. A then activated integration service automatically re-initializes a virtual router for connection to the additional PM via the virtual computer network and configures the re-initialized virtual router such that the additional PM communicates with the higher-ranking facility via the re-initialized virtual router.

12 Claims, 6 Drawing Sheets

(51) Int. Cl.
*G05B 19/418* (2006.01)
*H04L 12/713* (2013.01)

(52) U.S. Cl.
CPC ............ *G05B 2219/31198* (2013.01); *G05B 2219/31448* (2013.01); *G05B 2219/32398* (2013.01); *H04L 41/0816* (2013.01); *H04L 41/12* (2013.01); *H04L 41/22* (2013.01); *Y02P 90/18* (2015.11)

(58) Field of Classification Search
CPC . H04L 41/0809; H04L 41/0816; H04L 41/12; H04L 41/22; H04L 45/586; Y02P 90/18
See application file for complete search history.

(56) References Cited

U.S. PATENT DOCUMENTS

| | | | |
|---|---|---|---|
| 9,712,427 B1* | 7/2017 | Pittman | H04L 67/1097 |
| 2004/0207666 A1 | 10/2004 | Hally et al. | |
| 2008/0065243 A1 | 3/2008 | Fallman et al. | |
| 2013/0132545 A1 | 5/2013 | Schultze et al. | |
| 2015/0358278 A1 | 12/2015 | Albrecht et al. | |
| 2016/0182293 A1* | 6/2016 | Di Benedetto | H04L 41/0816 |
| 2016/0224363 A1* | 8/2016 | Joy | G06F 9/45558 |
| 2016/0254956 A1* | 9/2016 | Xu | H04L 41/0809 |
| | | | 370/255 |

FOREIGN PATENT DOCUMENTS

| | | |
|---|---|---|
| EP | 2955904 A1 | 12/2015 |
| RU | 2335012 C2 | 9/2008 |
| RU | 2595517 C2 | 8/2016 |

\* cited by examiner

COMMISSIONING MACHINES WITH VIRTUAL COMPONENTS IN ISOLATED OPERATION WITHOUT IP ADDRESS ASSIGNMENT

CROSS-REFERENCES TO RELATED APPLICATIONS

This application claims the priority of European Patent Application, Ser. No. 17157661.4, filed Feb. 23, 2017, pursuant to 35 U.S.C. 119(a)-(d), the content of which is incorporated herein by reference in its entirety as if fully set forth herein.

BACKGROUND OF THE INVENTION

The present invention relates to an operating method for a computer network having a plurality of ports connected to production machines.

The following discussion of related art is provided to assist the reader in understanding the advantages of the invention and is not to be construed as an admission that this related art is prior art to this invention.

Frequently, a plurality of automated production machines is operated in industrial operations. These production machines are frequently standardized. They in particular in each case comprise a plurality of intelligent units, which communicate with one another via a local network of the production machine. For example, a production machine of this kind comprises at least one automation device, a user interface and a sensor-actuator interface. Frequently, there is even a plurality of input/output modules, which communicate via the local network of the production machine with at least the automation device, in many cases additionally also with the user interface. Machines of this kind are frequently repeatedly constructed and operated in the same configuration.

To operate a machine of this kind it is possible to operate said machine in isolation (isolated operation). In this case, the internal, technical data structure of the production machines can be identical. Although, it is in particular necessary—based on the internal network of the production machine—for the addresses of the different intelligent units to be different from one another, with each new production machine, they can be used again with this new production machine.

Different problems occur in isolated operation. In particular, no remote access to the respective production machine is possible. Service and maintenance—for example data backup or a software update—always have to be performed on the spot on the respective production machine ("you have to go there"). Therefore, known practice from the prior art is to expand the local network of the production machine by a network connection. Such a case first enables remote access. This relates not only to service and maintenance but also to normal operation of the production machines. In particular, it is also possible to relocate the user interface externally in a component outside the production machine and in this way to control the production machine from outside. All that remains on the production machine is the "naked" display including an input facility such as, for example, a keyboard or a touchscreen combined with the display or the like. On the other hand, editing of production-machine data, including the formatting in which the edited data is visualized, takes place at least partially in the user interface which has been relocated outside. This user interface outside the production machine is usually called a virtual user interface.

Commissioning a production machine of this kind with a virtual user interface that has been relocated outside is much more complex that commissioning a production machine with an internal user interface. This is because in particular technical adjustment is required to match addresses to the environment in which said production machine is put into operation. Therefore, correct integration in a computer network outside the production machine is required.

Although automatic integration of intelligent units in a computer network is known, unlike the case with normal IT operation, such as occurs for example in offices and computer centers, in machinery and plant engineering in industrial automation it is not single intelligent units, but groups of intelligent units that are added to an existing computer network, namely all intelligent units of a production machine of this kind simultaneously. This requires other procedures than those in normal IT operation. In particular, it is not only necessary to integrate the individual intelligent unit in the existing computer network, but it is also additionally necessary to retain relationships within the group.

In the prior art, production machines of this kind are programmed by means of one single engineering project. The result is series machines with the same internal IP addresses and a local user interface. The engineering project assigns IP addresses to all subscribing intelligent units from a preconfigured pool of IP addresses. Alternatively, the engineering project assigns IP addresses for a configuration with a virtual user interface.

It is frequently furthermore necessary for the production machines to communicate via a computer network with a uniform, general higher-ranking facility for the production machines. To enable communication of this kind, it is necessary to adapt the IP addresses of the production machines. This relates to both the IP addresses of the internal intelligent units of the respective production machine and the IP addresses of the external intelligent units assigned to the relevant production machines, in particular the virtual user interface. In the prior art, this adjustment is frequently performed manually. Hence, adjustment is very labor-intensive and susceptible to error. However, also known are tools that can be used to change IP addresses on internal intelligent units in groups. These tools are machine-based. They are not able to detect virtual intelligent units.

It is, in principle, possible to automate the manual procedure. However, this requires the manufacturer of the production machine to have corresponding extensive expertise in IP and virtualization. If, furthermore, the production machine is installed in different virtualization environments for different customers, the machine manufacturer has to have expertise in all virtualization environments. On the other hand, the core competence of a machine manufacturer is naturally based on the construction of production machines, not on virtualization solutions.

During operation, production machines are regularly backed up. Different concepts are used for this. Archiving of acquired data and programs to be processed can be organized in different ways.

As mentioned above, in practice, frequently a plurality of automated production machines are present in one and the same industrial operation. Herein, frequently in each case one virtual user interface is implemented for a plurality of—advantageously all—production machines. Furthermore, the production machines communicate with a higher-ranking facility via a computer network. For example, they receive production tasks from the higher-ranking facility or send confirmations of operations or errors that occur to the higher-ranking facility. Maintenance and repair is also frequently simplified. The virtual user interfaces can, for example, be implemented in a computer cluster.

However, on the other hand, commissioning of a further production machine and particularly integration thereof in the existing computer network is difficult. In particular, there are significant difficulties in incorporating a new, additional, production machine in the existing computer network via which production machines already in production communicate and putting it into operation in this computer network while simultaneously reliably ensuring that any problems and other problems during commissioning do not affect normal communication of production machines already in operation. Therefore, it would be advantageous to be able first to include a further production machine in an existing group, but to be able to operate it in isolation and only later—following successful commissioning—to integrate and incorporate it in the existing computer network.

It would therefore be desirable and advantageous to address these problems and to obviate other prior art shortcomings by implementing a process sequence, such as acceptance in the existing computer network, thereafter commissioning via the computer network without the risk of negative impacts on the production machines already communicating via the computer network and, finally, complete integrating in the communication structure.

SUMMARY OF THE INVENTION

According to one aspect of the present invention, an operating method for a computer network having a plurality of ports connected in one-to-one correspondence to respective production machines, with each of the connected production machines communicating via the computer network with a virtual user interface assigned to a respective production machine and with a higher-ranking facility, wherein the virtual user interfaces and the higher-ranking facility are arranged outside the production machines, includes:
  monitoring with a monitoring component designated ports of the computer network to detect whether an further production machine is connected,
  automatically activating a commissioning service, whenever the monitoring component detects that the further production machine is connected to any one of the designated ports, wherein, as a result of the activation, the commissioning service automatically at least
  assigns a virtual user interface to the further production machine,
  re-initializes an individual virtual computer network within the computer network, and
  connects the further production machine to the assigned virtual user interface via the re-initialized virtual computer network, thereby isolating communication between the further production machine and the assigned virtual user interface from other communications taking place via the computer network,
  maintaining the isolated communication between the further production machine and the assigned virtual user interface until a release command is specified by an operator,
  activating, based on the specified release command, an integration service which, as a result of the activation, automatically
  re-initializes at least one virtual router,
  connects the re-initialized virtual router via the re-initialized virtual computer network with the further production machine, and
  configures the re-initialized virtual router so as to enable communication between the further production machine and the higher-ranking facility via the re-initialized virtual router.

Embodiments of the invention may include one or more of the following features.

It is possible for all ports of the computer network to be designated ports, i.e. to be monitored by the monitoring component for the connection of a further production machine. However, advantageously only some of the ports are designated ports. However, regardless of this, the further production machine can be connected to any one of the designated ports. I.e. the ports to which the further production machine is connected are not defined in advance. Any free designated port can be used.

It is possible for it to be already defined in advance which of the ports are designated ports. However, this is preferably defined by an operator. Hence, it is in particular possible for the operator to specify to monitoring component during the execution of the operating method (for example during power-up) which of the ports of the computer network are designated ports. For example, the available ports can be displayed on a screen via a mask. In this case, the operator can be offered the possibility of defining the designated ports by selection.

For the purposes of the present invention, the term "virtual user interface" does not mean a simple so-called "remote display", but a user interface, which in particular also comprises what is known as business logic. I.e., the virtual user interface—in each case at least partially—edits the entries entered via the input facility of the production machine and edits outputs to be output via the display of the production machine. One example of the editing of entries is verification of the locking of a specific key actuation or verification whether a key actuation has changed (i.e. the transition from actuated or non-actuated or vice versa). One example of editing of outputs is the manner in which certain output should be depicted.

It is possible, in the context of the assignment of the virtual user interface to the further production machine, for the commissioning service to re-initialize this virtual user interface. However, the virtual user interface is frequently one and the same for a plurality of production machines. Alternatively, it is therefore also possible, and in many cases even preferable, in the context of the assignment of the virtual user interface to the further production machine, for the commissioning service to release an already initialized virtual user interface for the further production machine. In this case, the only thing to note for the relevant virtual user interface is that it should communicate with the further production machine as selected. Furthermore, in this case, the already initialized virtual user interface is informed which virtual computer network should be used for this communication. Similar procedures are possible if an already existing virtual user interface only needs to be instantiated.

To initialize the virtual user interface, the commissioning service must know a configuration of the virtual user interface. It is possible for the commissioning service to receive this configuration from the operator or from the further production machine. Alternatively, it is possible for the commissioning service only to receive (for example actively request) a link from the further production machine and to download the configuration of the virtual user interface via the link. In this case, the commissioning service can also initialize or release or instantiate the virtual user interface based on the configuration.

In many cases, there is exclusively a communication from the further production machine with the assigned virtual user interface. In many cases, however, as a result of the activation, the commissioning service automatically additionally also incorporates a memory and/or a database in the re-initialized virtual computer network.

The computer network comprises a topology of distributor nodes. Advantageously, the commissioning service knows this topology. This is because, in this case, the commissioning service can in particular configure the distributor nodes correspondingly for the implementation of the re-initialized virtual computer network.

To initialize the virtual router it is for example possible for the integration service to implement and configure a virtual network card for the re-initialized virtual computer network and a virtual network card for the higher-ranking facility so that the further production machine communicates with the higher-ranking facility via the re-initialized virtual computer network, the virtual network card for the re-initialized virtual computer network and the virtual network card for the higher-ranking facility. This embodiment makes it simple to implement communication with the higher-ranking facility.

Furthermore, in many cases, it can be advisable, after the complete integration and incorporation of a production machine, to isolate the production machine again. For example, this can be advisable in the event of problems occurring in the later operation of the production machine or if the production machine has to be moved to another site. Therefore, in one preferred embodiment of the operating method, it is therefore possible, as a result of the operator issuing an exclusion command, for an exclusion service to be activated and, as a result of the activation, for the exclusion service automatically to separate the previously initialized virtual router from the higher-ranking facility. If required, the separation can be reversed later.

In the simplest case, only the separation of the virtual router takes place. The virtual router as such is retained. Alternatively, it is however also possible for the exclusion service to disconnect the previously initialized virtual router.

Disconnection of the virtual router can in particular be advantageous if, after the separation of the virtual router from the higher-ranking facility, as the result of a disconnect command by the operator, the exclusion service additionally separates the virtual user interface assigned to the further production machine from the further production machine. In the simplest case, only the separation of the corresponding virtual user interface from the further production machine takes place. Alternatively, the exclusion service can use the disconnect command also to separate the corresponding virtual computer network.

According to another advantageous feature of the present invention, a life-phase configuration module can be implemented to coordinate the monitoring component, the commissioning service and the integration services. In this case it is in particular possible     for the monitoring component to report the recognition of the connection of the further production machine to one of the designated ports of the computer network to the life-phase configuration module,     for the commissioning service to be activated by the life-phase configuration module,     for the life-phase configuration module to receive the release command from the operator and     for the integration service to be activated by the life-phase configuration module.

When the disconnection service is provided, the life-phase configuration module can also receive the exclusion command and possibly also the disconnect command from the operator and activates the exclusion service correspondingly.

According to another aspect of the present invention, a computer program which, when the machine code is executed by the administrative component, causes the administrative component to operate the computer network according to the aforedescribed operating method according to the invention.

According to yet another aspect of the present invention, an administrative component of a computer network is programmed with the aforedescribed computer program so, that as a result of the execution of the machine code of the computer program, the administrative component operates the computer network according to the aforedescribed operating method according to the invention.

According to still another aspect of the present invention, a computer network includes the aforedescribed administrative component according to the invention.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
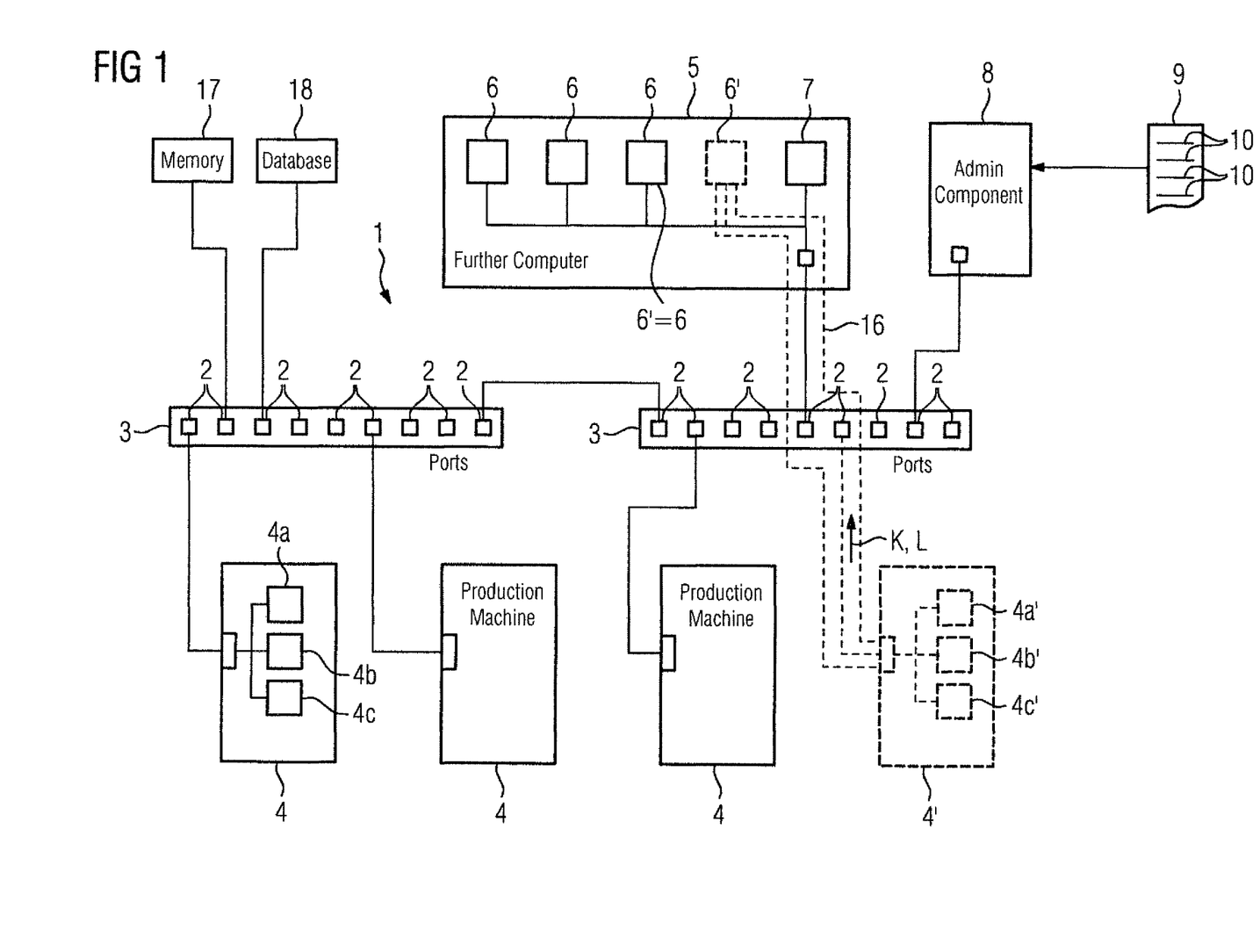
FIG. 1 shows a computer network and components connected to the computer network according to the present invention.

Turning now to the drawing, and in particular to FIG. 1, there is shown a computer network 1—for example a LAN (=local area network)—comprises a plurality of ports 2. The ports 2 can, for example, be grouped in a number of switches 3. The minimum number of switches 3 is 1. However, it is, also possible for a plurality of switches 3 to be present. The switches 3 can be physical switches or virtual switches. Production machines 4 are connected to some of the ports 2. Other ports 2 are—at least initially—not yet occupied. A further computer 5 is connected to a further port 2.

The production machines 4 are—at least from the viewpoint of the computer network 1—identical to one another or at least similar. Herein, similar means that each production machine 4 comprises at least one control unit 4*a*, one sensor-actuator interface 4*b* and one local user interface 4*c* (zero terminal) and that these intelligent units 4*a*, 4*b*, 4*c* communicate in each case at least with one virtual user interface 6 (vHMI=virtual human machine interface) assigned to the respective production machine 4 via the computer network 1. In FIG. 1, the control unit 4*a*, the sensor-actuator interface 4*b* and the local user interface 4*c* are only depicted for one of the production machines 4 for reasons of clarity. However, they are also present with each production machine 4. The control unit 4*a* is the logic that controls the production machine 4. The sensor-actuator interface 4*b* is the interface via which signals from sensors of the production machine 4 are read-in and commands are issued to actuators of the production machine 4. The local user interface 4*c* is used for communication with a user (not depicted in FIG. 1). The local user interface 4*c* in particular comprises a display and an input facility such as, for example, a keyboard or a touchscreen or the like combined with the display. However, the local user interface 4*c* substantially only receives entries from the user and issues outputs to the user. On the other hand, more extensive editing of data is performed by the virtual user interface 6. The virtual user interface 6 in particular comprises the so-called business logic. Therefore, the virtual user interface 6—completely or at least partially—carries out the preprocessing and editing of entries made via the input facility of the local user interface 4*c* and also the preprocessing and editing of outputs to be output via the display. In the following, references to communication between the production machines 4 always means communication between at least one of these intelligent units 4*a*, 4*b*, 4*c* with the virtual user interface 6 assigned to the respective production machine 4 or another unit assigned to the respective production machine 4.

The respective virtual user interface 6 can, for example, be implemented in accordance with the depiction in FIG. 1 for some or all of the production machines 4 within the further computer 5. In this case, the virtual user interfaces 6 are implemented by corresponding programming of the further computer 5. However, the user interfaces 6 can also be implemented in some other way. Furthermore, the production machines 4 communicate with a higher-ranking facility 7 via the computer network 1. According to the depiction in FIG. 1, the higher-ranking facility 7 can also be implemented within the further computer 5. In this case, the higher-ranking facility 7 is implemented by corresponding programming of the further computer 5. However, the higher-ranking facility 7 can also be implemented in some other way. The decisive factor is that the virtual user interfaces 6 and the higher-ranking facility 7 are arranged outside the production machines 4, i.e. that it is necessary to use the computer network 1 for communication between production machines and the virtual user interfaces 6 and the higher-ranking facility 7.

The computer network 1 furthermore comprises an administrative component 8. The administrative component 8 is also connected via one of the ports 2 to the computer network 1. Optionally, it can be implemented within the further computer 5. Regardless of whether the administrative component 8 is implemented inside or outside the further computer 5, the administrative component 8 is programmed with a computer program 9. The computer program 9 comprises machine code 10, which can be directly executed by the administrative component 8. Execution of the machine code 10 by the administrative component 8 causes the administrative component 8 to operate the computer network 1 in accordance with an operating method as is explained below in conjunction with FIG. 2 and the further figures.

Figure 2:
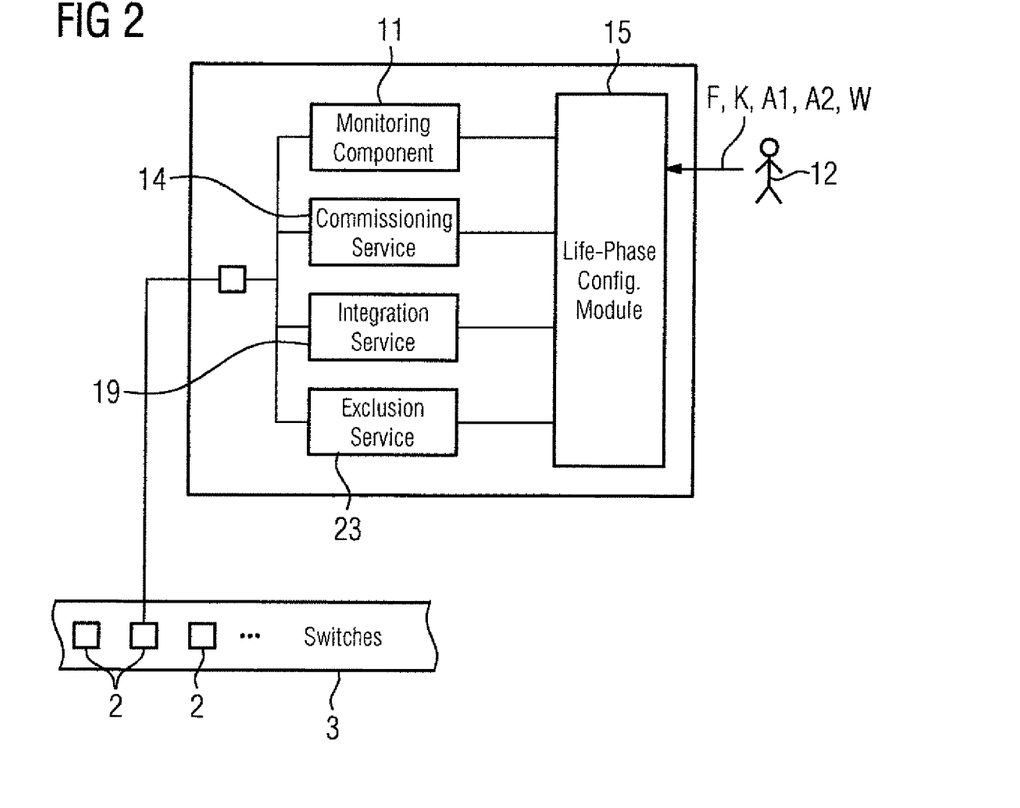
FIG. 2 shows the computer network in FIG. 1 and an administrative component.

In the context of the execution of the machine code 10, the administrative component 8 implements a monitoring component 11 (see FIG. 2). The monitoring component 11 can be implemented as a software block. According to FIG. 3, in a step S1, the monitoring component 11 monitors designated ports 2 of the computer network 1 for the connection of a further production machine. In the following, for differentiation from the production machines 4 already connected to the computer network 1, the further production machine is given the reference character 4'. It is depicted by a dashed line in FIG. 1. The monitoring component 11 repeats the step S1 until it recognizes the connection of the further production machine 4'. Herein, it is not a question as to whether the further production machine 4' is connected to a quite specific port 2 of the computer network 1. The decisive factor is only that this actually involves one (i.e. any one) of the designated ports 2 of the computer network 1.

Figure 4:
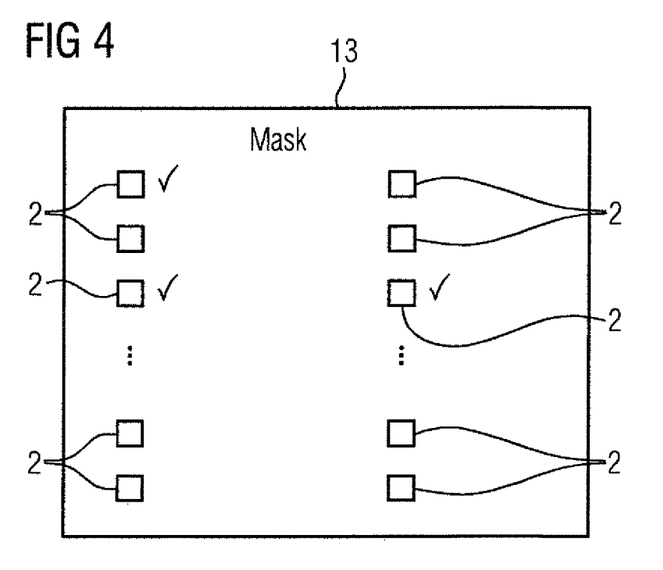
FIG. 4 shows a mask for displaying existing ports.

It is possible for the monitoring component 11 to monitor all ports 2 of the computer network 1 correspondingly. Advantageously, however, only some of the ports 2 of the computer network 1 are monitored. In particular, according to the depiction in FIG. 4, the available ports 2 can be displayed to an operator 12 via a screen or a similar display unit, for example via a mask 13. In this case, as indicated in FIG. 4 by way of example by check marks, the operator 12 is able to specify to the monitoring component 11 by a corresponding choice of operator-desired ports 2 which of the ports 2 of the computer network 1 should be monitored by said monitoring component.

Figure 5:
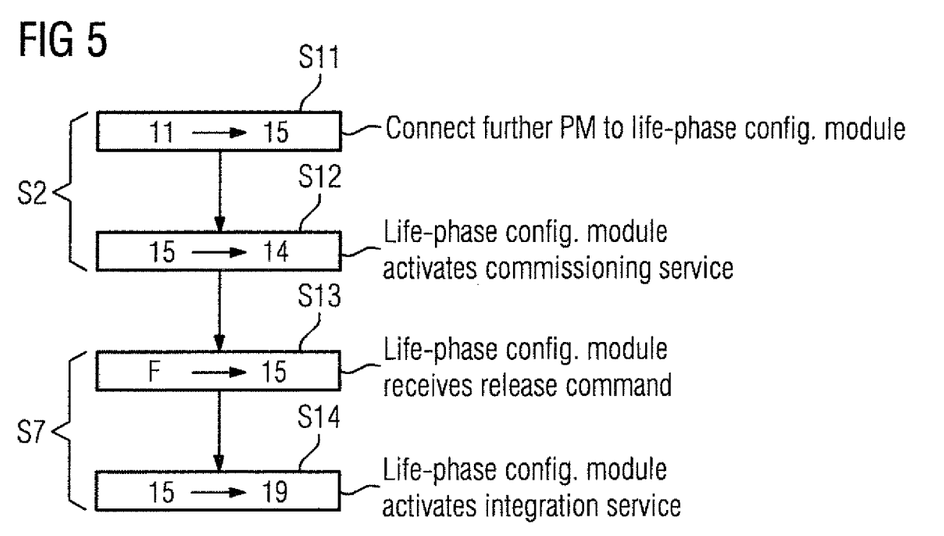
FIG. 5 shows another flowchart.

Following the recognition of a connection of this kind, the monitoring component 11 moves onto a step S2. In the step S2—directly or indirectly, but in each case automatically—a commissioning service 14 is activated. For example, as a result of the execution of the machine code 10 according to the depiction in FIG. 2, the administrative component 8 can implement a life-phase configuration module 15. In this case, the monitoring component 11 according to FIG. 5 can report the recognition of the connection of the further production machine 4' to the life-phase configuration module 15 as the partial implementation of the step S2 in a step S11. The life-phase configuration module 15 can activate the commissioning service 14 in a step S12. Hence, the step S12 completes the step S2 in FIG. 3.

Figure 3:
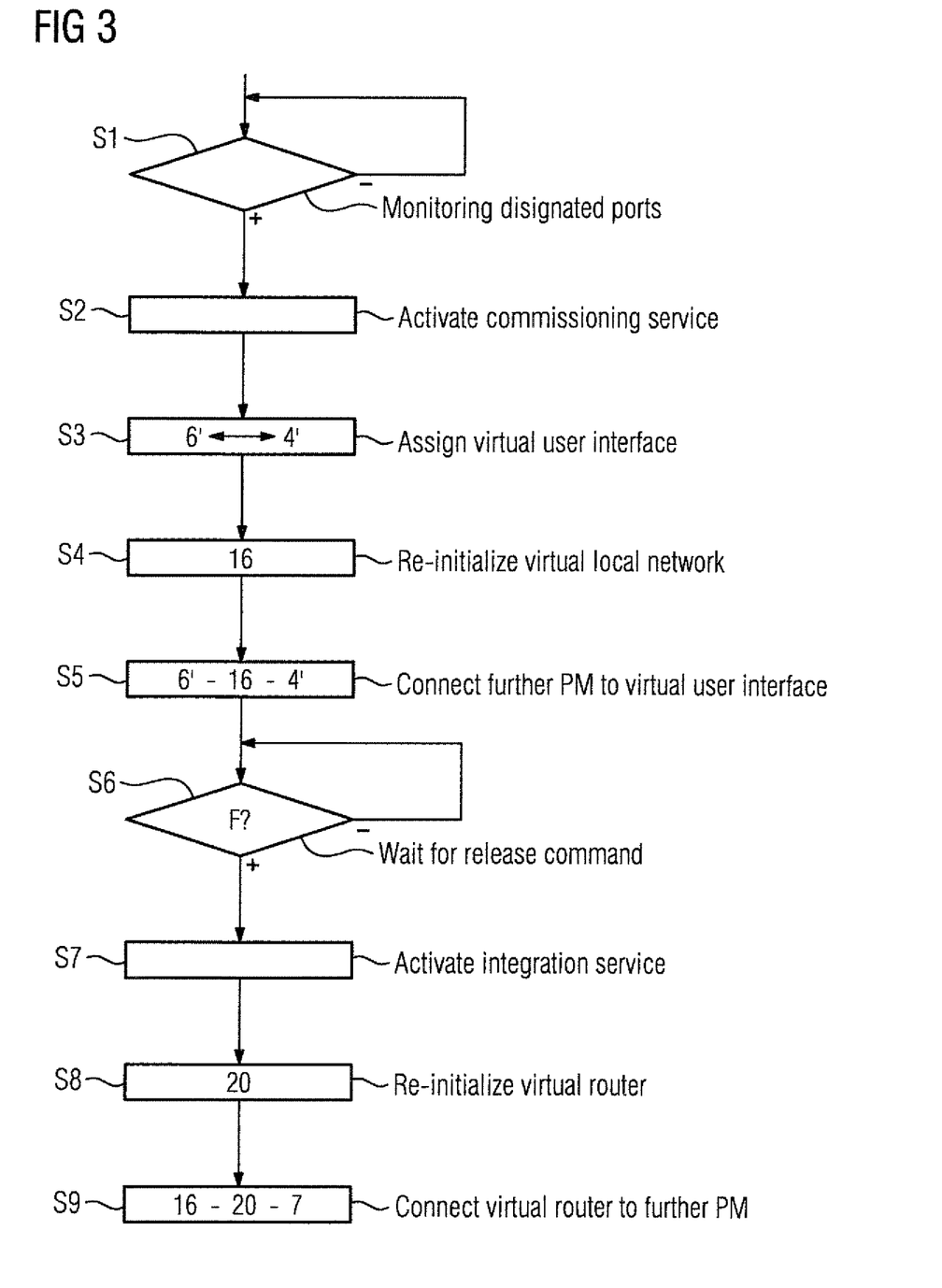
FIG. 3 shows a flowchart.

As a result of its activation, the commissioning service 14 automatically performs a plurality of activities. Initially, in a step S3, it assigns a virtual user interface to the further production machine 4'. In the following, this virtual user interface is called a further virtual user interface and, for differentiation from the already existing virtual user interfaces 6, given the reference character 6'.

In the context of the assignment of the further virtual user interface 6' to the further production machine 4', the commissioning service 14 can, for example, re-initialize the further virtual user interface 6'. This possibility is indicated in FIG. 1 by a dashed depiction of the further virtual user interface 6'. Alternatively, the commissioning service 14 can release an already initialized virtual user interface 6 for the further production machine. This is indicated in FIG. 1 by equating (6'=6) the further virtual user interface 6' with an already existing virtual user interface 6. Other types of initialization, for example by instantiation, are possible.

The configuration K of the further virtual user interface 6' must be known to the commissioning service 14. To this end, the commissioning service 14 can receive the configuration K from the operator 12. Alternatively, the commissioning service 14 can receive the configuration K from the further production machine 4'. As a further alternative, the commissioning service 14 can receive a link L from the further production machine 4' and then download the configuration K via the link L. However, regardless of the nature in which the configuration K is made known to the commissioning service 14, the commissioning service 14 initializes the further virtual user interface 6' based on the configuration K or releases it based on the configuration K or instantiates it correspondingly.

Furthermore, in a step S4, the commissioning service 14 re-initializes an individual virtual computer network 16 (i.e. vLAN=virtual local area network) within the computer network 1. The commissioning service 14 in particular assigns an identifier to the virtual computer network 16 in the context of the initialization. For example, a topology of distributor nodes 3 (=switches 3) of the computer network 1 can be known to the commissioning service 14. Therefore, the commissioning service 14 can address the distributor nodes 3 and configure them correspondingly (in particular notify them of the identifier) and in this way initialize the virtual computer network 16. The measures to be taken are known to the person skilled in the art.

Following the initialization of the virtual computer network 16 as such, in a step S5 the commissioning service 14 connects the further production machine 4' to the virtual user interface 6' assigned thereto via the re-initialized virtual computer network 16. In particular, the commissioning service 14 configures the further virtual user interface 6' and all intelligent units of the further production machine 4', which are to communicate with one another via the virtual computer network 16, correspondingly. The intelligent units of the further production machine 4' are in particular its control unit 4a', its sensor-actuator interface 4b' and its local user interface 4c'.

For the configuration, the commissioning service 14 for example also notifies the identifier of the virtual computer network 16 to the further virtual user interface 6' and all corresponding intelligent units 4a', 4b', 4c' of the further production machine 4'. If a communication from the further production machine 4' and/or the further virtual user interface 6' with other units as well is desired—for example a memory 17 and/or a database 18—as a result of its activation, the commissioning service 14 additionally also incorporates these units 17, 18 in the re-initialized virtual computer network 16. This is not depicted in FIG. 1. The individual units to be incorporated in the re-initialized virtual computer network 16 must obviously have been made known to the commissioning service 14 in advance.

Hence, as a result of the communication via the virtual computer network 16 initialized individually for the further production machine 4', a communication from the further production machine 4' with the virtual user interface 6' assigned thereto (and optionally the further units 17, 18) is implemented, which is isolated from other communications taking place via the computer network 1.

The isolated communication of the further production machine 4' with the virtual user interface 6' assigned thereto (and optionally the further units 17, 18) is initially retained. In particular, in a step S6, there is a pause until a release command F is specified by the operator 12. As soon as this is the case, as a result of the specification of the release command F, in a step S7—directly or indirectly, but automatically in each case—an integration service 19 is activated. For example, according to FIG. 5, in a step S13, the life-phase configuration module 13 can receive the release command F and then activate the integration service 19 in a step S14.

As a result of the activation, the integration service 19 automatically performs a plurality of activities. As a result of these activities—based on the computer network 1—the further production machine 4', which was previously operated in isolation, is integrated in the overall structure of the computer network 1 (including communication with the higher-ranking facility 7).

Figure 6:
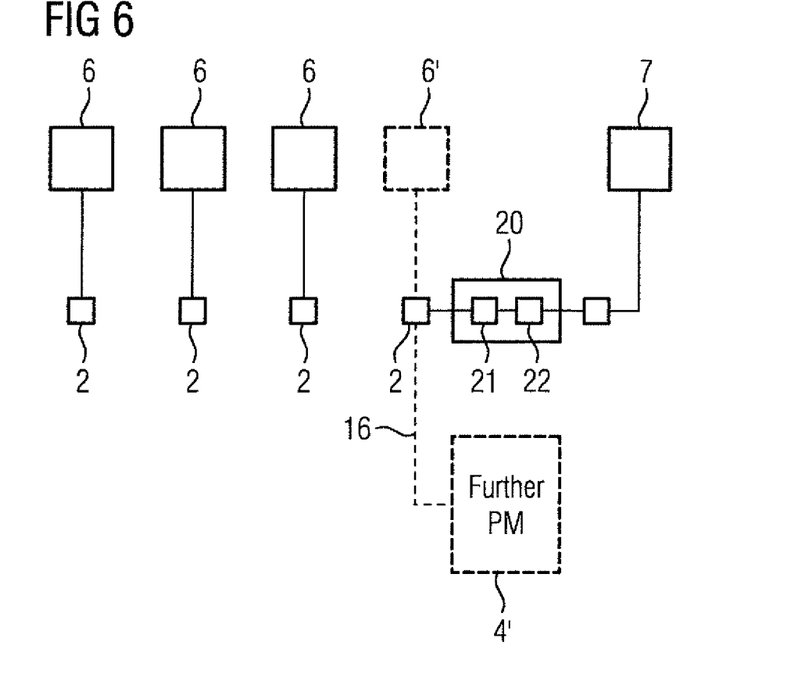
FIG. 6 shows a part of the computer network.

In the context of its activities, in a step S8, the integration service 19 re-initializes a virtual router 20 (see FIG. 6). For example, for the implementation of the virtual router 20, the integration service 19 can implement a virtual network card 21 for the re-initialized virtual computer network 16 and a virtual network card 22 for the higher-ranking facility 7. Furthermore, in a step S9, the integration service 19 connects the re-initialized virtual router 20 with the further production machine 4' via the re-initialized virtual computer network 16. In particular, the integration service 19 can configure the virtual network card 21 for the re-initialized virtual computer network 16 such that this virtual network card 21 handles the communication for the re-initialized virtual computer network 16. To this end it is, for example, possible for an IP address to be assigned to the virtual network card 21 for the further production machine 4'. This address must be known to the integration service 19 in advance. Furthermore, the integration service 19 configures the re-initialized virtual router 20 such that the further production machine 4' communicates with the higher-ranking facility 7 via the re-initialized virtual router 20. In particular, the integration service 19 can configure the virtual network card 22 for the higher-ranking facility 7 such that this virtual network card 22 handles the communication for the higher-ranking facility 7. To this end it is, for example, possible for in principle any IP address from a preconfigured pool to be assigned to the virtual network card 22. The integration service 19 selects the IP address from the pool and assigns it to the virtual network card 22. The configuration of routers—including virtual routers—is known to those skilled in the art.

Hence, as a result, automatic configuration of the virtual router 20 takes place so that, after configuration of the virtual router 20, communication between the further production machine 4' and the higher-ranking facility 7 from the further production machine 4' takes place via the re-initialized virtual computer network 16, the virtual network card 21 for the re-initialized virtual computer network 16 and the virtual network card 22 for the higher-ranking facility 7. Within the router 20, the necessary conversion of the IP addresses is performed by means of the two virtual network cards 21, 22. Those skilled in the art are generally familiar with this process. If necessary, the functions of the virtual router 20 can be adjusted during the running time.

Advantageously, the commissioning service 14 furthermore provides direct access to the further production machine 4' via one of the ports 2. For example, the commissioning service 14 is able to ascertain which of the ports 2 are not occupied, offer the operator 12 the unoccupied ports 2 to choose from and then integrate a port 2 selected by the operator 12 in the virtual computer network 16. Optionally, the commissioning service 14 can also initialize a further virtual computer network (not depicted) in which it only incorporates the intelligent units 4a', 4b', 4c' of the further production machine 4', but not the assigned virtual user interface 6'. In this case, direct access from the corresponding port 2 to the intelligent units 4a', 4b', 4c' of the further production machine 4' is possible.

It is possible for access to the further production machine 4' via the named port 2 to be maintained including following the initialization of the communication from the further production machine 4' with the higher-ranking facility 7. However, preferably this access is only maintained until the further production machine 4' is fully incorporated in the production network 19 by means of the integration service. Then, it is deleted again. Deletion is preferably performed by the integration service 19.

It is possible to carry out the above-explained procedure from scratch, i.e. starting with the connection of the first production machine 4 to the computer network 1. In this case, with each connection of a production machine 4, in each case, a new virtual computer network 16 is initialized, via which the respective production machine 4 communicates with its respective virtual user interface 6 (and optionally further units). In this case, an individual virtual router 20 is also initialized and configured for each production machine 4 in each case.

Advantageously, it is possible for the incorporation and integration of the virtual computer network 16 in the entire computer network 1 to be undone once again. For example, according to the depiction in FIG. 7, it is possible for a check to be performed in a step S21 as to whether the operator 12 specifies an exclusion command A1 (see FIG. 1). In this case, as a result of the exclusion command A1, an exclusion service 23 can be activated in a step S22. In this case, as a result of the activation, in a step S23, the exclusion service 23 automatically separates the previously initialized virtual router 20 from the higher-ranking facility 7. For example, in the context of the step S23, it is possible for the connection of the previously initialized virtual router 20 to the higher-ranking facility 7 to be interrupted. It is also possible for the exclusion service 23 to disconnect the previously initialized virtual router 20 in the step S23.

Figure 7:
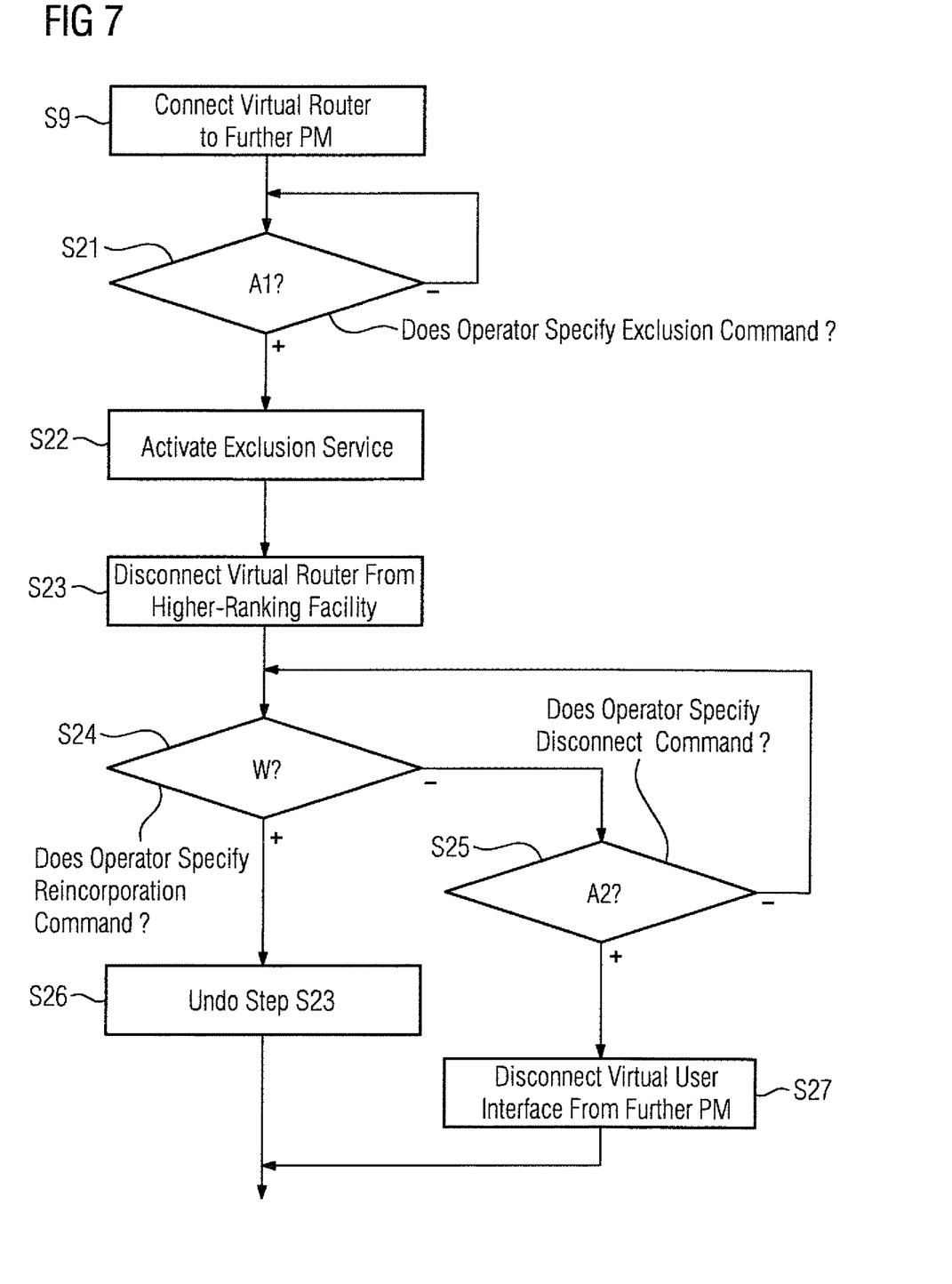
FIG. 7 shows still another flowchart.

The virtual computer network 16 is retained in the state that now prevails. Furthermore, also possible is a communication from the further production machine 4' with the further user interface 6'. However, this communication is now again isolated from the other communications taking place via the computer network 1. This state is usually only temporary. Either another incorporation takes place, and so step S23 is undone, or the further production machine 4' is completely removed from the computer network 1. Therefore, a check is performed in steps S24 and S25 as to whether the operator 12 is specifies a reincorporation command W or a disconnect command A2. If the operator 12 specifies the reincorporation command W, the step S23 is undone in a step S26. The step S26 corresponds partially or completely to the steps S8 and S9. If required, the step S26 can be carried out by the exclusion service 23 or by the integration service 19. If the operator 12 specifies the disconnect command A2, in a step S27, the exclusion service 23 additionally separates the virtual user interface 6' assigned to the further production machine 4' from the further production machine 4'.

To summarize, therefore, the present invention relates to the following facts:

A computer network 1 comprises ports 2 to some of which production machines (=PM) 4 are connected, which communicate in each case with at least one assigned virtual user interface (=vHMI) 6 and a higher-ranking facility 7 outside the PM 4 via the computer network 1. A monitoring component 11 monitors designated ports 2 for the connection of a further PM 4'. If the connection of the further PM 4' is identified, a commissioning service 14 is activated automatically which in turn automatically assigns a vHMI 6' to at least the further PM 4', re-initializes an individual virtual computer network 16 within the computer network 1 and connects the further PM 4' to the vHMI 6' assigned thereto via the re-initialized virtual computer network 16. As a result, communication between the further PM 4' and the assigned vHMI 6' takes place in isolation from other communications. Isolated communication is retained until a release command F is specified. Then, an integration service 19 is activated, which in turn automatically re-initializes at least one virtual router 20, connects this virtual router 20 via the virtual computer network 16 to the further PM 4' and configures the re-initialized virtual router 20 such that the further PM 4' communicates with the higher-ranking facility 7 via the re-initialized virtual router 20.

The present invention has numerous advantages. In particular, the combination of monitoring component 11, commissioning service 14 and integration service 19—optionally in conjunction with the life-phase configuration module 15—enables in a simple and automated manner both the isolated commissioning of the further production machine 4' and the complete integration thereof in the computer network 1. No manual adjustment of project planning—in particular of IP addresses—is required. Maintenance is simplified. In particular, it is, for example, possible for local user interfaces 4c, 4c' to be exchanged in a simple manner without first having to perform a data backup.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for a computer network having a plurality of ports connected in one-to-one correspondence to respective production machines, with each of the connected production machines communicating via the computer network with a virtual user interface assigned to a respective production machine and with a higher-ranking facility, wherein the virtual user interfaces and the higher-ranking facility are arranged outside the production machines, the method comprising:

monitoring designated ports of the computer network to which at least one existing production machine is connected, in order to detect whether a further production machine in addition to the existing production machine is connected to the computer network, automatically activating a commissioning service, whenever a connection of the further production machine to any one of the designated ports is detected, wherein, as a result of the activation, the commissioning service automatically at least assigns a virtual user interface to the further production machine, re-initializes within the computer network a virtual computer network which enables isolated communication between the further production machine and the assigned virtual user interface independent of the computer network, and connects the further production machine to the assigned virtual user interface via the re-initialized virtual computer network, thereby isolating the further production machine from other communications taking place via the computer network, maintaining the isolated communication between the further production machine and the assigned virtual user interface until a release command is specified by an operator, activating, in response to the specified release command, an integration service which, as a result of the activation, automatically re-initializes at least one virtual router, connects the re-initialized virtual router via the re-initialized virtual computer network with the further production machine, and configures the re-initialized virtual router so as to enable communication between the further production machine and the higher-ranking facility via the re-initialized virtual router.

2. The method of claim 1, wherein only some of the ports of the computer network are designated ports.

3. The method of claim 1, wherein the ports of the computer network designated as designated ports are specified by the operator.

4. The method of claim 1, wherein the assigned virtual user interface at least partially processes entries inputted on the further production machine and processes outputs to be outputted on a display on the further production machine.

5. The method of claim 1, wherein in the context of the assignment of the virtual user interface to the further production machine, the commissioning service re-initializes the virtual user interface or releases an already established virtual user interface for the further production machine or instantiates an already established virtual user interface for the further production machine.

6. The method of claim 5, wherein the commissioning service receives a configuration of the virtual user interface from the operator or from the further production machine, or receives a link from the further production machine, and downloads the configuration of the virtual user interface via the link, and wherein the commissioning service initializes or releases the virtual user interface based on the configuration.

7. The method of claim 1, wherein as a result of the activation, the commissioning service automatically additionally also incorporates a memory or_a database in the re-initialized virtual computer network.

8. The method of claim 1, wherein the commissioning service knows a topology of distributor nodes of the computer network and configures the distributor nodes accordingly when implementing the re-initialized virtual computer network.

9. The method of claim 1, wherein to initialize the virtual router, the integration service implements and configures a virtual network card for the re-initialized virtual computer network and a virtual network card for the higher-ranking facility, so that the further production machine communicates with the higher-ranking facility via the re-initialized virtual computer network, the virtual network card for the re-initialized virtual computer network and the virtual network card for the higher-ranking facility.

10. The method of claim 1, wherein the operator activates an exclusion service by specifying an exclusion command, and wherein, as a result of the activation of the exclusion service, the exclusion service automatically disconnects the previously initialized virtual router from the higher-ranking facility.

11. The method of claim 10, wherein after the separation of the virtual router from the higher-ranking facility as the result of a disconnect command by the operator, the exclusion service additionally disconnects the virtual user interface from the further production machine.

12. The method of claim 1, further comprising:
detecting a connection of the further production machine to one of the designated ports of the computer network and reporting the connection,
activating the commissioning service,
receiving the specified release command from the operator, and
activating the integration service.

* * * * *